(12) United States Patent
Burba et al.

(10) Patent No.: US 6,388,451 B1
(45) Date of Patent: May 14, 2002

(54) LEAKAGE CURRENT CANCELLATION DEVICE

(75) Inventors: Joseph Carl Burba, Ramona, CA (US); Robert W. Minck, Southfield, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 140 days.

(21) Appl. No.: 09/640,484

(22) Filed: Aug. 16, 2000

(51) Int. Cl.[7] .................. G01R 31/08; G01R 31/02; G01R 27/08; G05F 3/20
(52) U.S. Cl. .................. 324/522; 324/509; 324/720; 323/315
(58) Field of Search ................. 324/509, 521, 324/522, 720, 763; 323/273, 356, 315

(56) References Cited

U.S. PATENT DOCUMENTS

| | | | |
|---|---|---|---|
| 3,996,513 A | * | 12/1976 | Butler .................. 324/509 |
| 5,481,194 A | | 1/1996 | Schantz et al. |
| 5,559,657 A | | 9/1996 | Lam |
| 5,672,952 A | | 9/1997 | Szepesi |
| 5,754,114 A | | 5/1998 | Gnadt |
| 5,818,236 A | * | 10/1998 | Sone et al. .................. 324/509 |
| 5,999,008 A | * | 12/1999 | Currin et al. .................. 324/763 |

* cited by examiner

Primary Examiner—N. Le
Assistant Examiner—Anjan K. Deb

(57) ABSTRACT

A system (20, 30, 40, 50) and method for canceling a leakage current is provided that uses line voltages (L1, L2) that are out of phase with each other to produce a counter leakage potential that cancels leakage current. In one embodiment of the invention, the actual potential of the phases is measured (42, 52, 54) and used to determine the counter potential that is to be applied to the line voltage (L1 or L2) that is generating the leakage current. The counter potential is applied to the appropriate line voltage by way of a transistor circuit (Q1, Q2). The transistor circuit (Q1, Q2) is controlled through standard electronic circuitry (28), or by way of a microprocessor device (32).

5 Claims, 2 Drawing Sheets

LEAKAGE CURRENT CANCELLATION DEVICE

TECHNICAL FIELD

The present invention relates generally to electric and hybrid-electric vehicles, and more particularly to canceling leakage current during charging of a hybrid-electric vehicle.

BACKGROUND OF THE INVENTION

The unintended circulation of current, or leakage current, is a pervasive problem in electric and hybrid-electric vehicles. The large number of high voltage devices and wiring introduce the problem of leakage currents that may ultimately cause safety, electromagnetic compatibility and charging concerns with the vehicles. There are many causes of leakage current, and the effects include safety concerns that are of the utmost importance in addressing.

The United States National Electric Code (NEC) dictates the requirement that electric and hybrid-electric vehicle chassis be referenced to earth through a safety ground whenever the vehicle is being charged. This requirement is in effect to guarantee that leakage currents are safely shunted to earth. Because the NEC also requires that electric utility service outlets be protected by devices that measure the current imbalance between the conductors, the potential exists for these devices to disconnect power to the vehicle if the current imbalance exceeds the code value, i.e. 5 milliamps for level 1 charge. These devices protect persons in the event of conduction of current through an unintended path that exceeds 5 milliamps, because the power is disconnected thereby preventing a hazardous shock. The NEC establishes specific requirements for an electric or hybrid-electric vehicle that requires a device to disconnect power at approximately 20 milliamps for level 2 charging. If there is any fault in the safety ground, the power is disconnected.

AC leakage components introduce an imbalance between two primary conductors in the vehicle being charged that can activate the ground fault circuit. This is called nuisance activation. In the event of nuisance activation, the power to the charger is disconnected, and the vehicle will not be properly charged. The result of an uncharged vehicle is severe customer dissatisfaction.

Another cause of leakage current is related to electromagnetic compatibility. High frequency current components on the vehicle being charged can conduct back onto an ac line and cause harmful interference with receiving equipment, such as televisions or radios. In order to control the conducted noise within limits regulated by the United States Federal Communication Commission, filters are used to attenuate the conducted noise. However, the filters contribute to leakage current.

In an attempt to prevent leakage currents, it has been proposed to galvanically isolate high voltage from the charge line. This approach is accomplished by coupling a transformer to the charge line. However, the transformer is very large and very heavy. High frequency transformers that are smaller and lighter may be used, but add complexity and cost due to the high cost of the transformers and the switching devices. Another alternative is to disconnect high voltage components during charging, virtually eliminating some of the major leakage paths. However, this approach is not always practical. Often cabin preheat and pre-cool functions that precondition the vehicle temperature just before driving are present on vehicles to offer significant battery energy savings. These features require heaters and air conditioners be active even during charging demanding the high voltage components remain active. Therefore, there is a trade-off between a reduction in leakage current and an efficient use of valuable battery energy.

It is clear that there are many causes to the problem of leakage current, but there are too few solutions. What is needed is an effective device for eliminating leakage current that does not add significant cost and/or weight to an electric or hybrid-electric vehicle.

SUMMARY OF THE INVENTION

It is an object of the present invention to provide reliable charging of an electric or hybrid-electric vehicle. It is another object of the present invention to eliminate the need for galvanic isolation of a charging device.

It is a further object of the present invention to cancel leakage current during charging of an electric or hybrid-electric vehicle. It is still a further object of the present invention to introduce a counter leakage potential in order to cancel leakage current.

In carrying out the above objects and other objects and features of the present invention, a leakage current cancellation device is provided that uses line voltages that are out of phase with each other to produce a counter leakage potential that cancels leakage current. The device is located on board an electric or hybrid-electric vehicle between the incoming charge line and the vehicle charger.

According to the present invention, a differential transformer senses the leakage current. Each of two primary line voltage conductors passes through the differential transformer. A current imbalance in the transformer produces a potential across the transformer sense winding that is amplified. Because the imbalance is a measure of the net leakage, the potential across the sense winding is representative of the leakage current. When the net leakage exceeds a predetermined value, a reverse potential is induced to cancel the leakage current. The leakage current may be continuously monitored to compensate for time varying transients.

In another embodiment of the present invention, the potential amplifier is replaced with a microprocessor that senses the leakage on each conductor independently and adjusts the induced reverse potentials individually.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Figure 1:
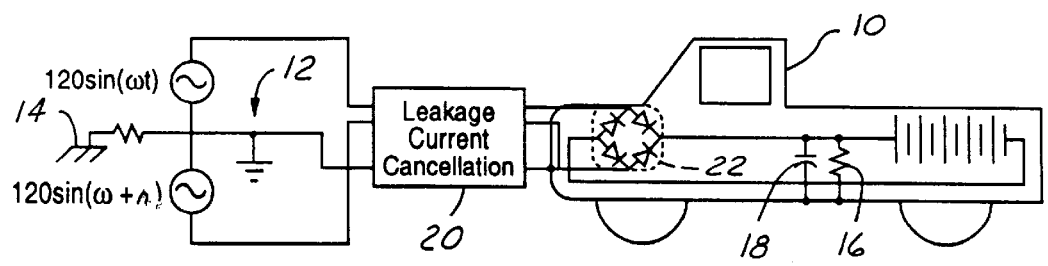
FIG. 1 is a diagram of an electric vehicle being charged according to the present invention.

FIG. 1 depicts an electric vehicle 10 being recharged through connection to electric utilities 12. The connection introduces potentials within the vehicle 10 with respect to earth ground 14. The vehicle 10 represents a large conducting surface that creates the likelihood that some current will conduct to the vehicle 10 through a parasitic impedance 16 or bypass capacitance 18. If not safely conducted to ground, this current creates a potential shock hazard. The leakage current cancellation device 20 of the present invention controls leakage current by introducing a counter leakage potential to cancel the leakage current. The device 20 is located between the incoming line voltages from the electric utilities 12 and a charger 22 on the vehicle 10. The device 20 may be mounted on the vehicle 10.

Figure 2:
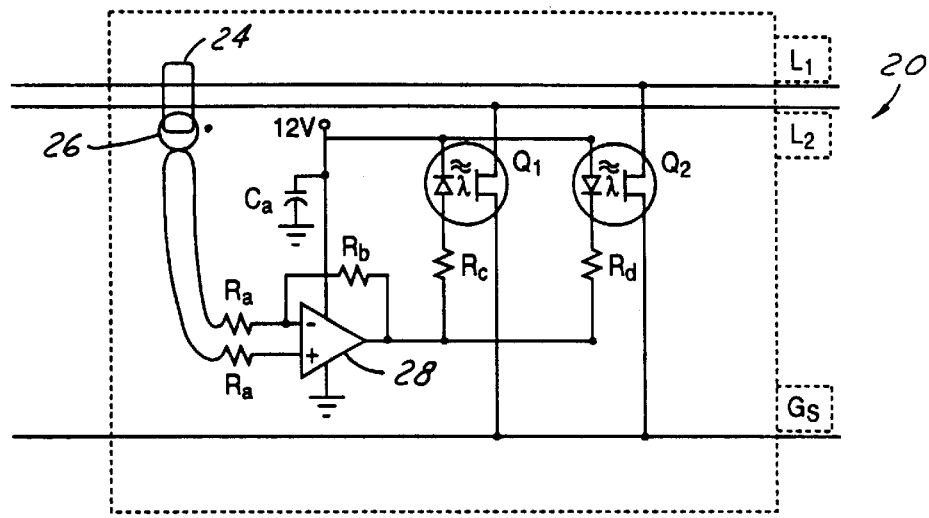
FIG. 2 is a schematic of one embodiment of the leakage current cancellation device of the present invention.

FIG. 2 is a schematic of one embodiment of the leakage current cancellation device 20 of the present invention. Rather than isolating the leakage paths from earth ground, the present invention uses one of the line voltages from the electric utilities. The line voltages L1 and L2 are out of phase with each other. According to the present invention, a counter leakage potential is introduced by way of the opposite line voltage, thereby canceling leakage current.

A differential transformer 24 senses the leakage current. Each of the line voltage conductors L1, L2 passes through the differential transformer 24. A current imbalance in the transformer 24 produces a potential across the sense winding 26. The current imbalance is a measure of the net leakage, so the potential across the sense winding 26 is also a representation of the leakage current. A differential amplifier 28 amplifies the potential across the sense winding 26. The output of the amplifier 28 controls two optically isolated field effect transistors Q1 and Q2.

At any point in time, if the net leakage current is predominantly generated from L1, Q1 will conduct and induce a reverse potential to a safety ground, Gs, thereby canceling the leakage current. Likewise, if the net leakage is predominantly generated from L2, Q2 will conduct to induce a reverse potential to Gs. The device 20 of the present invention continuously monitors the leakage current. Therefore, it is capable of compensating for time varying transients.

The resistors Rc and Rd allow Q1 and Q2 to be individually biased. The biasing is set to be function of the gain characteristics of each transistor Q1 and Q2. The resistors Ra and Rb establish the gain of the differential amplifier 28, which is also dependent upon the output voltage of the sense winding 26 and the gain of the transistors Q1 and Q2. The capacitor Ca filters noise induced onto the amplifier 28.

Figure 3:
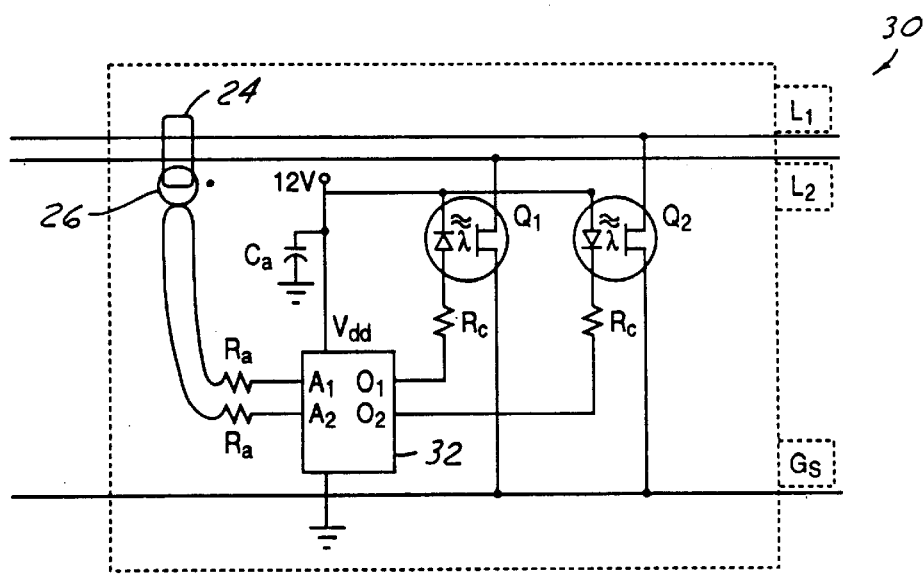
FIG. 3 is a schematic of another embodiment of the leakage current cancellation device of the present invention.

FIG. 3 is another embodiment of the leakage current cancellation device 30 of the present invention. In FIG. 3, like reference numbers depict like components as they are referenced in FIG. 2. A microprocessor 32 is used to sense the leakage and to individually adjust Q1 and Q2. There is more flexibility with respect to component tolerance, noise using the microprocessor 32.

Figure 4:
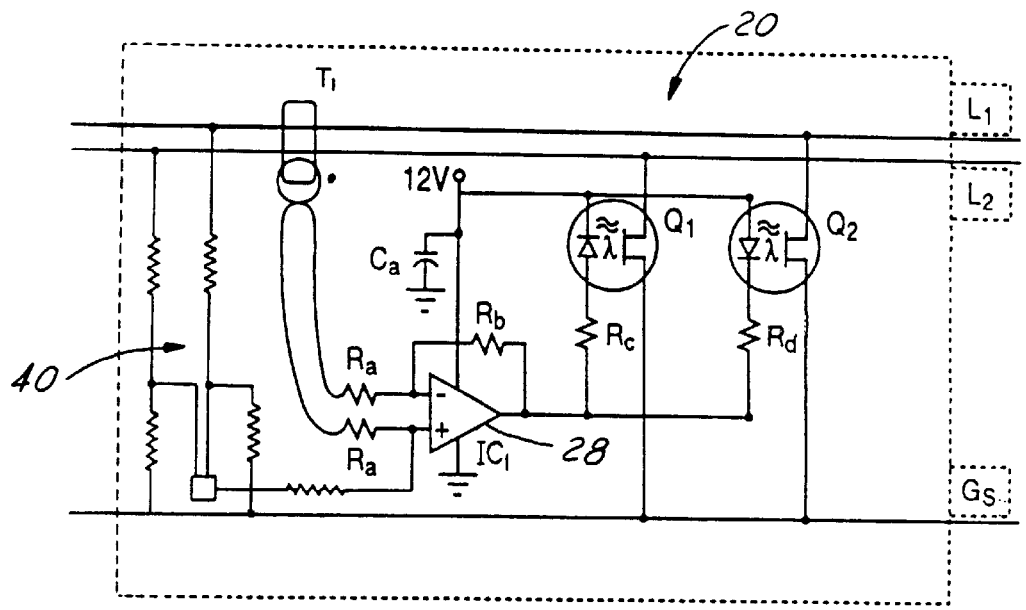
FIG. 4 is a schematic of another a embodiment of the leakage current cancellation device of FIG. 2 incorporating potential measurements.
Figure 5:
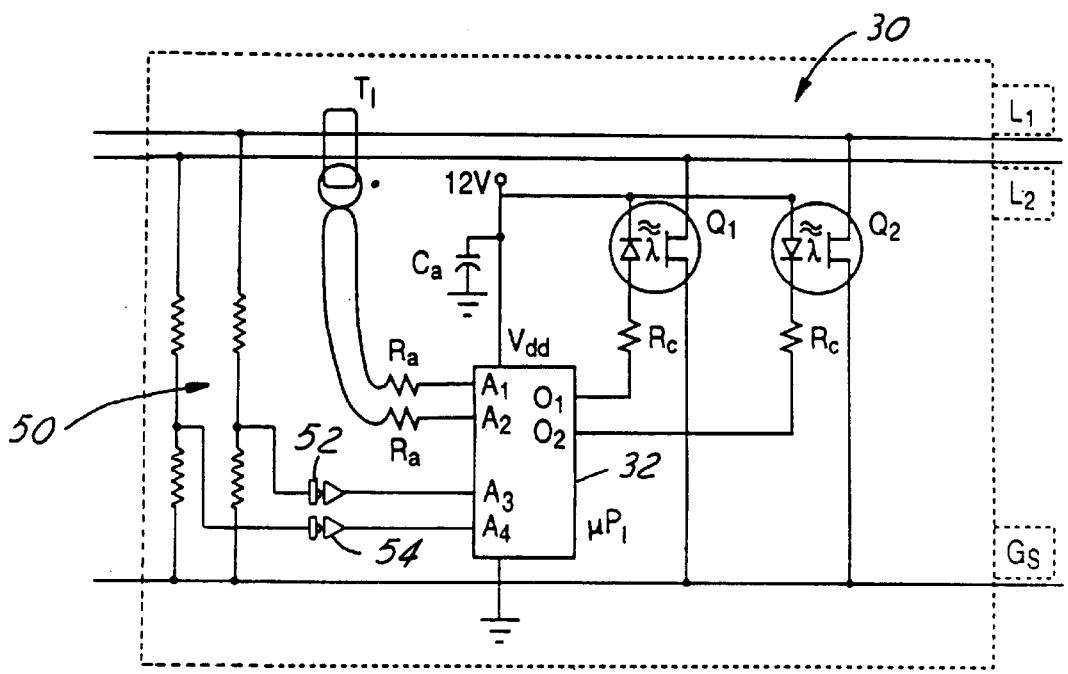
FIG. 5 is a schematic of another embodiment of the leakage current cancellation device of FIG. 3 incorporating potential measurements.

In another embodiment of the present invention, shown in FIGS. 4 and 5, the actual potential of the phases of L1 and L2 is measured. The measured potential determines how much potential is available to cancel the leakage current. This will allow the transistors to be controlled in a way that optimally cancels the leakage current. In the event the phase difference is something other than 180 degrees, the leakage current may not be balanced by the phases. For example, many industrial three-phase power supplies have phase differences of 120 degrees. In this situation, the leakage current phase has a different phase than the potential that is available to cancel the leakage current. By directly sensing the phase, the transistors can be biased in a way that maximizes the cancellation of the leakage current.

FIG. 4 is an example of a phase sensing circuit that can be used in conjunction with the leakage current cancellation device 20. The potential of the phase difference between L1 and L2 is sensed by a circuit 40 and summed at the amplifier 28. This measure of the potential allows the transistors Q1 and Q2 to be adjusted as needed to maximize the cancellation of the leakage current.

FIG. 5 is an example of a phase sensing circuit design 50 that may be used in conjunction with the embodiment 30 of the present invention. In the example shown in FIG. 5, two optical isolators 52 and 54 are provided for sensing the potential of the phases and used as inputs $A_3$ and $A_4$ to the microprocessor 32. As a result of directly sensing the potential available, the transistors can be more accurately controlled to optimize the cancellation of the leakage current. The flexibility of the microprocessor design shown in FIG. 5 is enhanced by the detection of the line phase difference.

There are many alternatives to the design of the phase sensing circuit that one skilled in the art is capable of substituting and achieving results similar to those of the present invention. The phase sensing circuits shown in FIGS. 4 and 5 are intended for example purposes only.

An advantage of the present invention is that it eliminates the need for isolated chargers in battery-powered electric vehicles. There is a significant cost and weight savings associated with the elimination of costly and bulky isolation equipment.

The invention covers all alternatives, modifications, and equivalents, as may be included within the spirit and scope of the appended claims.

What is claimed is:

1. A leakage current cancellation device for an electric vehicle comprising:

a differential transformer having a first line voltage and a second line voltage passing therethrough, said first and second line voltages being out of phase with each other, said differential transformer having a sense winding whereby a leakage current produces a current imbalance in said differential transformer, said current imbalance produces a potential across said sense winding;

a safety ground;

means for controlling first and second transistors, said first transistor being connected to said second line voltage and said second transistor being connected to said first line voltage, said first and second transistors being connected to said safety ground;

whereby said first transistor becomes conductive when said leakage current is generated from said first line voltage thereby inducing a reverse potential to said safety ground, and said second transistor becomes conductive when said leakage current is generated from said second line voltage thereby inducing a reverse potential to said safety ground.

2. The device as claimed in claim 1 wherein said means for controlling said first and second transistors is a differential amplifier.

3. The device as claimed in claim 1 wherein said means for controlling said first and second transistors is a microprocessor.

4. The device as claimed in claim 1 wherein said first and second transistors are optically isolated field effect transistors.

5. The device as claimed in claim 1 wherein said leakage current cancellation device is located on the electric vehicle.

* * * * *